United States Patent [19]
Gill et al.

[11] Patent Number: 5,291,099
[45] Date of Patent: Mar. 1, 1994

[54] NEON SIGN POWER SUPPLY CIRCUIT WITH AUTOMATIC POWER INTERRUPTION

[75] Inventors: John M. Gill, Twin Lakes, Wis.; Robert H. Clausing, Lindenhurst, Ill.

[73] Assignee: Actown-Electrocoil, Inc., Spring Grove, Ill.

[21] Appl. No.: 900,955

[22] Filed: Jun. 18, 1992

[51] Int. Cl.⁵ ............................................. H05B 37/00
[52] U.S. Cl. ................................... 315/119; 315/246; 315/276
[58] Field of Search ............... 315/119, 127, 219, 225, 315/246, 362, 276, DIG. 7

[56] References Cited

U.S. PATENT DOCUMENTS

| | | | |
|---|---|---|---|
| 2,309,711 | 2/1943 | Pearson | 315/127 |
| 2,310,149 | 2/1943 | McDermott | 315/127 |
| 4,330,736 | 3/1982 | Perper | 315/209 R |
| 5,068,570 | 11/1991 | Oda et al. | 315/128 |
| 5,081,399 | 1/1992 | Jy | 315/121 |
| 5,097,182 | 3/1992 | Kelly | 315/219 |
| 5,099,407 | 3/1992 | Thorne | 363/37 |

FOREIGN PATENT DOCUMENTS

| | | | |
|---|---|---|---|
| 0014896 | 1/1989 | Japan | 315/246 |
| 0084592 | 3/1989 | Japan | 315/246 |
| 02-78696 | 11/1990 | Japan | 315/246 |

Primary Examiner—Robert J. Pascal
Assistant Examiner—Arnold Kinkead
Attorney, Agent, or Firm—Emrich & Dithmar

[57] ABSTRACT

A power supply circuit for a neon tube includes a step-up power transformer having a primary winding connectable to a power source, a secondary winding to which the neon tube is connected, and an auxiliary winding which is used to sense if the secondary winding is loaded or not and develops a control voltage proportional to current flowing through the neon tube, the control voltage maintaining a relay operated so that the primary winding of the transformer is connected to the power source in the absence of load fault conditions, a load fault condition causing the control voltage to decrease below the level required to maintain the relay operated, so that the primary winding of the transformer is disconnected from the power source, interrupting high voltage in the secondary winding of the transformer.

18 Claims, 1 Drawing Sheet

NEON SIGN POWER SUPPLY CIRCUIT WITH AUTOMATIC POWER INTERRUPTION

BACKGROUND OF THE INVENTION

This invention relates to power supply circuits for supplying high voltages to loads, such as neon signs and the like, and more particularly, to a power supply circuit which automatically interrupts the supply of the high voltage to a load under certain fault conditions.

Certain functional devices require operating voltages in the order of several hundred to several thousand volts. For example, neon tubes used for signs require such high voltages for stimulating inert gases contained within the tubes to produce visible light. Power supply circuits for neon signs generally include a step-up transformer having a primary winding connected to line voltage at 120 VAC and a secondary winding to which the neon tube is connected. The step-up transformer transforms the line voltage at 120 VAC to the high voltage required for lighting the neon tube.

Under certain fault conditions, the presence of the high voltage on the secondary winding of the transformer presents a potentially dangerous condition. For example, when tubing of a neon sign is broken, or when the neon sign is disconnected from the output of the power supply circuit, either purposefully or inadvertently, the power terminals may be exposed, presenting a potential shock hazard.

Accordingly, power supply circuits for neon tubes have been proposed which reduce the magnitude of the voltage provided on the secondary winding of the power transformer under certain fault conditions. Such power supply circuits include a sensing circuit which senses if the secondary winding is loaded or not and reduces power to the load whenever an abnormal condition is sensed. One neon tube power supply circuit includes a transformer which is connected in circuit with the power step-up transformer in the output stage of the power supply circuit. The sensing circuit responds to a voltage level that occurs on the primary side of the power supply transformer as the result of the secondary load being removed to enable a protective circuit to prevent a transistor of a high voltage output stage from being over driven. One disadvantage of this arrangement is that the sensing circuit is connected directly in the high power output stage of the power supply circuit. In addition, a separate transformer is required for sensing the fault condition, adding considerable cost to the power supply circuit.

In another known power supply circuit, the power transformer includes a sensing winding which couples a voltage indicative of a no load condition to a control circuit. The control circuit responsively causes the power supply circuit to be placed in a stand-by mode for as long as the no load condition exists. A serious shortcoming of this arrangement is that if someone were to contact the secondary electrodes while the power supply circuit is in the standby mode, such contact could be sensed as load being reconnected and the high voltage would be reapplied to the secondary winding, allowing a shock hazard to exist.

SUMMARY OF THE INVENTION

It is an object of the present invention to provide an improved power supply circuit for supplying high voltage to functional devices, such as neon tubes and the like.

Another object of the invention is to provide a power supply circuit for functional devices operated at high voltages, which automatically interrupts power to the power transformer primary and secondary windings in the event of load failure conditions.

A further object of the invention is to provide a power supply circuit for functional devices operated at high voltages which provides automatic load removal shutdown protection through the use of a sensing winding which is added to a conventional 60 Hertz laminated power transformer, providing a power supply circuit which is of simple construction and is inexpensive.

The present invention provides a power supply circuit for producing an operating voltage for a load comprising a step-up transformer having a primary winding, a secondary winding, and an auxiliary winding, switching means operable when enabled to connect the primary winding to a source of alternating current, the primary winding being disconnected from the source when the switching means is disabled, the load being connectable to the secondary winding, enabling means for enabling the switching means to operate to connect the primary winding to the source of alternating current whereby an operating voltage is produced on the secondary winding for energizing the load when the load is connected to the secondary winding, and load condition sensing means including the auxiliary winding for producing a control voltage for maintaining the switching means enabled only when the load is connected to the secondary winding, the enabling means disabling the switching means to thereby disconnect the primary winding from the source in the absence of the control voltage.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF THE PREFERRED EMBODIMENT

Figure 1:
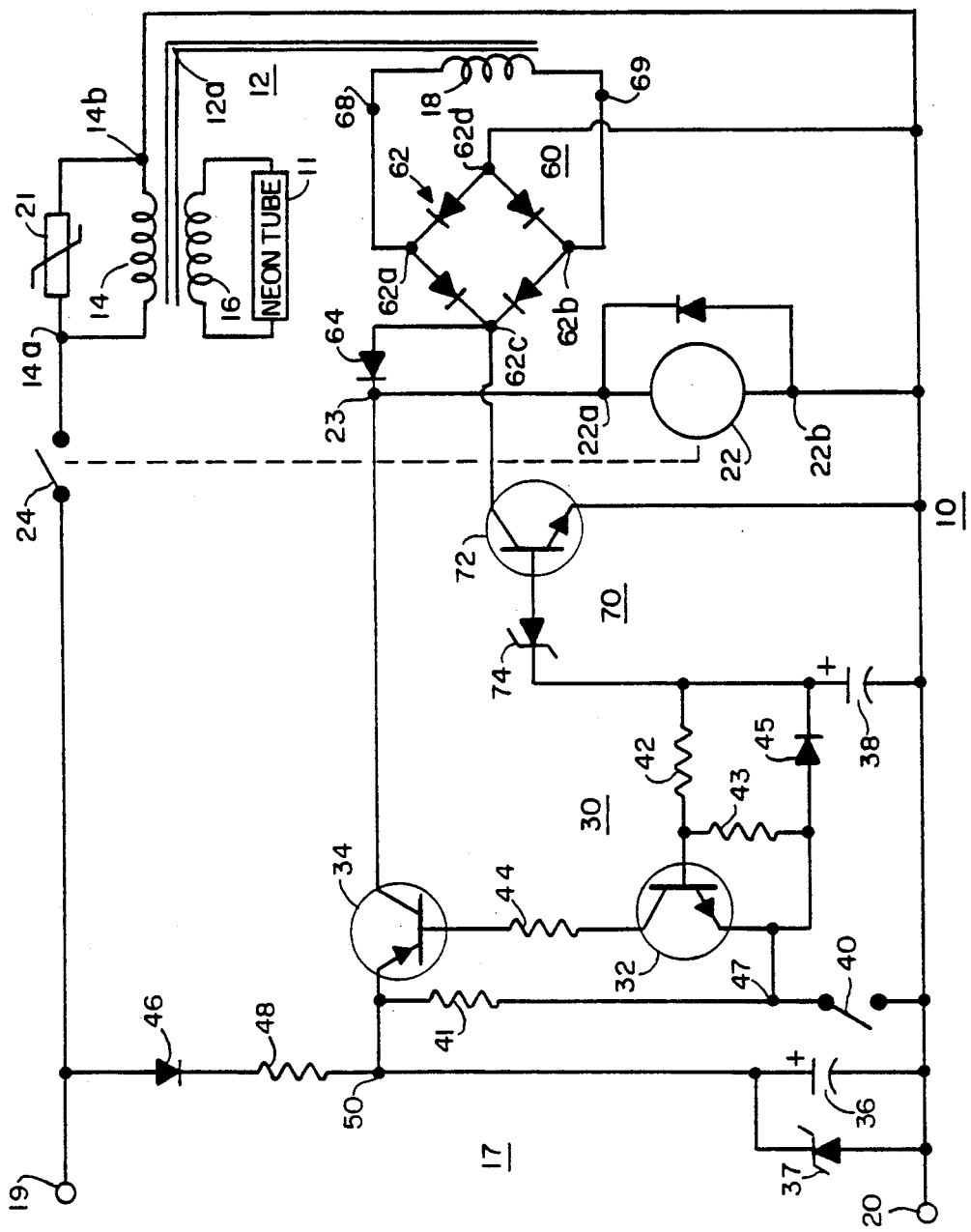
FIG. 1 is a schematic circuit diagram of the power supply circuit with automatic power interruption provided by the present invention.

Referring to the drawings, FIG. 1 is a schematic circuit diagram of the power supply circuit 10 according to the present invention. For purposes of illustration, the power supply circuit 10 is described with reference to an application for supplying a high voltage to a neon tube 11 used for a neon sign. However, the power supply circuit can be used in other applications wherein a high voltage is required for driving a load or energizing a functional device.

The power supply circuit 10 includes a high voltage transformer 12 including a primary winding 14, a secondary winding 16, and an auxiliary winding 18. The transformer 12 is a voltage step-up transformer which provides the high voltage across its secondary winding 16 required for activating the neon tube 11 which is connected to the secondary winding 16 of the transformer 12. Transformer 12 may be a conventional 60 Hertz, laminated transformer having the windings 14, 16 and 18 wound on a core 12a which is pressed into a frame (not shown). However, other transformer structures may be used for the power transformer.

Briefly, the power supply circuit 10 provides load removal shutdown under open circuit conditions for the load connected to the secondary winding 16. Under open circuit condition, the power supply circuit 10 disconnects power from the primary winding 14, thereby removing potentially hazardous high level voltage from the secondary winding 16. The load fault conditions are detected using the auxiliary winding 18 which develops a control voltage proportional to load current. The control voltage is used to maintain power to the load under no fault conditions and to cause power to be removed from the load under load fault conditions in a manner to be described.

More specifically, the power supply circuit 10 includes a power input stage 17, a control relay 22, a relay enabling or turn-on circuit 30, a sensing circuit 60 and a relay turn-off circuit 70. The power input stage 17 includes power input terminals 19 and 20 which are connectable to a source of 120 VAC. Power is connected to the primary winding 14 of the transformer only when the control relay 22 is operated. Relay 22 has one terminal 22a connected at node 23 to the outputs of the enabling circuit 30 and the sensing circuit 60. The second terminal 22b of the relay is connected to power input terminal 20. The relay 22 has normally open contacts 24 connected in series with power input terminal 19 and one terminal 14a of the primary winding 14 of the transformer 12. The second terminal 14b of the primary winding 14 is connected to power input terminal 20. A metal oxide varistor 21 is connected in parallel with the primary winding 14 to suppress high voltage transients across the winding, thereby minimizing arcing on contacts 24.

Operation of the control relay 22 is controlled by the enabling circuit 30, which includes a transistor 32, a transistor 34, capacitors 36 and 38, a power switch 40, and resistors 41, 42, 43 and 44 and diode 45. A diode 46, a resistor 48, and capacitor 36, which are connected in series between power input terminals 19 and 20, form the power input stage 17 for the power supply circuit 10., and provide half wave rectified power to the enabling circuit 30. A Zener diode 37 is connected in parallel with capacitor 36. Diode 46 and resistor 48 connect the capacitor 36 in a series charging path between the power input terminals 19 and 20. Resistor 41, diode 45 and capacitor 38 are connected in a series, unidirectional charging path between the junction of resistor 48 and capacitor 38 at node 50 and power input terminal 20. Capacitor 38 and resistors 42 and 43 form a timing circuit which allows tentative operation of relay 22 for a time interval following the closing of the power switch 40. The duration of the time interval is determined by the discharge time of capacitor 38 and the discharge time of capacitor C36 into relay coil 22.

Transistor 32 is connected for common-emitter operation and has its base connected through resistor 42 to the positive side of capacitor 38 and through resistor 43 to the junction of resistor 41 and power switch 40 at node 47, to which is connected the emitter of transistor 32. The collector of transistor 32 is connected through resistor 44 to the base of transistor 34. Transistor 34 is connected for common base operation and has its emitter connected to the junction of capacitor 36 and resistor 48 at node 50 and its collector connected to terminal 22a of relay 22 at node 23.

The sensing circuit 60 includes the auxiliary winding 18 of the transformer 12, a full wave bridge rectifier 62 and a diode 64. The bridge rectifier 62 has input terminals 62a and 62b connected to terminals 68 and 69 of the auxiliary winding 18 and output terminals 62c and 62d. Output terminal 62c is connected through diode 64 to terminal 22a of relay 22 and output terminal 62d is connected to power input terminal 20.

Figure 2:
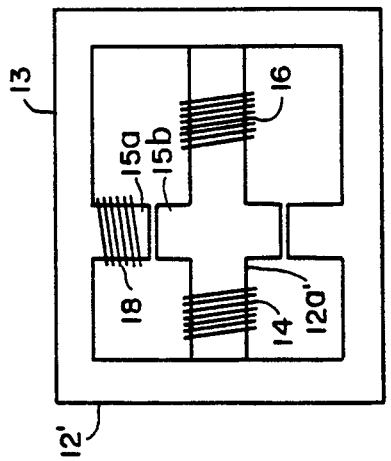
FIGS. 2 illustrates an alternative embodiment for a transformer for the power supply circuit shown in FIG. 1.

In the exemplary embodiment, the auxiliary winding 18 is wound on the core 12a of the 60 Hertz laminated transformer. However, in an alternative arrangement illustrated in FIG. 2, the transformer 12' includes a core 12a' which is pressed into a frame 13. The primary winding 14 and the secondary winding 16 are wound on the core 12a, on opposite ends thereof. A magnetic shunt including an auxiliary core 15a with the auxiliary winding 18 wound thereon is pressed into place in a gap 15b formed between the core 12a' and the frame.

Referring to FIG. 1, relay turn off circuit 70 includes a transistor 72 and a Zener diode 74 which is reverse-connected in the base circuit of the transistor 72. That is, the Zener diode 74 has its anode connected to the base of transistor 72 and its cathode connected to the positive side of capacitor 38. The collector of transistor 72 is connected to output terminal 62c of the bridge rectifier 62. The emitter of transistor 72 is connected to power input terminal 20.

In operation, assuming that power input terminals 19 and 20 are connected to a source of 120 VAC and that power switch 40 is open, then during positive half cycles of the ac power signal, current flows from power input terminal 19 through diode 46, resistor 48 and through capacitor 36 to power input terminal 20, charging capacitor 36 to a value set by Zener diode 37. As capacitor 36 charges, the potential at node 50 rises and diode 45 becomes forward biased. Current then flows from power input terminal 19, through diode 46 and resistor 48 to node 50, through resistor 41, diode 45 and capacitor 38, charging the capacitor 38.

When the power switch 40 is closed to energize the neon sign 11, a discharge path is provided for capacitor 38 through resistors 42 and 43 and the power switch 40. Current flow through resistors 42 and 43 forward biases transistor 32 which then conducts, forward biasing transistor 34, connecting the positive side of capacitor 36 at node 50 through the emitter collector circuit to terminal 22a of relay 22. Capacitor 36 discharges through the emitter collector circuit of transistor 34 and the relay 22, causing the relay to operate and close its contacts 24, connecting power to the primary winding 14 of transformer 12. The length of time that transistors 32 and 34 are enabled is determined by the discharge time of capacitor 38. When 120 VAC power is applied to the primary winding of transformer 12, a high voltage is produced in the secondary winding 16 of the transformer 12. The high voltage is applied to the neon tube 11 to activate the neon sign. Under normal conditions, when high voltage is generated in the secondary winding 16 and a load is present, magnetic flux begins to increase in the shunt auxiliary winding 18, producing a control voltage which is proportional to the secondary load current. The control voltage is typically in the order of 30 VAC but may be adjusted to suit particular needs. The control voltage is applied across the bridge network 62 which provides full wave rectified current through diode 64 and the relay 22 for maintaining the relay 22 operated.

When the power switch 40 is opened subsequently to turn off the neon sign, capacitor 38 recharges. When the potential at the cathode of Zener diode 74 exceeds the breakdown voltage for the Zener diode 74, plus the voltage drop across the base emitter circuit of transistor 72, the Zener diode 74 conducts, enabling transistor 72 to turn on and provide a current shunt path from the output of the bridge rectifier to power input terminal 20. Accordingly, current is shunted away from the relay 22, causing the relay 22 to release. Therefore, the contacts 24 of relay 22 open, removing power from the transformer 12.

When the load on the secondary winding 16 of the transformer 12 is removed, for example, because of the tubing in the neon sign becoming broken, this results in a corresponding decrease in flux generated in the auxiliary winding 18. Consequently, the current in the auxiliary winding 18 decreases to a level which is insufficient to maintain the relay 22 operated and so contacts 24 open, disconnecting power from the primary winding 14 of the transformer 12. With the removal of power from the primary winding 14, the high voltage is eliminated on the secondary winding 16, removing any shock hazard. The power supply circuit 10 is reset by simply cycling the power switch 40 from on to off and back to on. The timing function of capacitor 38 will enable the relay 22 tentatively as has been described.

In the event that no load is connected to the secondary winding 16 of the transformer 12 when power switch 40 is closed, then relay 22 is operated and maintained operated for a time duration set by the discharge time of capacitor 38. Then relay 22 is deenergized because there is insufficient current developed in the auxiliary winding 18 to maintain the relay 22 energized when capacitor 38 becomes discharged.

Thus, it can be seen that the present invention provides a power supply circuit for loads, such as neon signs, which require high operating voltages. The power supply circuit removes potentially hazardous high voltages from the output of the power supply circuit in the event the tubing of the neon sign becomes broken or if the neon sign is disconnected from the output of the circuit either purposefully or inadvertently. Moreover in the event there is no load connected to the output at the time that power is applied to the circuit, the potentially hazardous high level output voltage is removed from the output of the power supply circuit after a brief time duration established by the relay turn on circuit 30. In either case, the power supply circuit latches to its off condition with power disconnected from the output transformer 12 for open circuit failure conditions of the load.

The auxiliary winding 18 on the power transformer shunt develops a voltage proportional to the load current. Under normal load current conditions, as when a neon sign is properly connected to the output of the power supply circuit, sufficient voltage is generated to maintain the control relay operated so that power is delivered to the primary winding of the transformer 12. If the load is disconnected from the secondary circuit, a change in flux will result and the change in flux as coupled to the auxiliary winding 18 will cause the control voltage produced by the auxiliary winding 18 to drop below the level necessary to maintain the control relay 22 energized. Accordingly, the relay 22 disconnects power from the output transformer 12, removing potentially hazardous high level output voltage from the output of the power supply circuit 10

Moreover, the sensing circuit 60 is of a simple and yet effective construction, and can be provided by adding a sensing winding to an existing 60 Hertz, laminated transformer of a neon sign to provide load removal shut down protection in the manner which has been described. In addition, the current limiting shunt circuit provided by transistor 72 of the relay turn off circuit 70 provides fast and effective turn off of the relay 22 in response to detection of an unsafe load condition.

We claim:

1. A power supply circuit for producing an operating voltage for a load comprising:

a step-up transformer having a primary winding, a secondary winding, and an auxiliary winding, said auxiliary winding being electrically independent of said secondary winding so that no current flows in common through said secondary winding and said auxiliary winding;

switching means operable when enabled to connect said primary winding to a source of alternating current, said primary winding being disconnected from said source when said switching means is disabled;

the load being connectable to said secondary winding;

enabling means for enabling said switching means to operate to connect said primary winding to said source of alternating current whereby an operating voltage is produced on said secondary winding for energizing the load when the load is connected to said secondary winding;

and load condition sensing means including said auxiliary winding for producing a control voltage for maintaining said switching means enabled only when the load is connected to said secondary winding, said enabling means disabling said switching means to thereby disconnect said primary winding from said source in the absence of said control voltage.

2. The power supply circuit of claim 1, wherein said control voltage produced by said auxiliary winding is proportional to load current flowing through the load, permitting said enabling means to disable said switching means for open-circuit load conditions.

3. The power supply circuit of claim 1, wherein said enabling means includes timing means for disabling said switching means whenever said control voltage fails to be produced within a predetermined interval of time after said switching means is enabled.

4. The power supply circuit of claim 3, wherein said enabling means includes power switch means manually operable to a first state to cause said timing means to initiate said predetermined time interval.

5. The power supply circuit of claim 4, including turn-off means operable when enabled to override said control voltage to thereby disable said switching means.

6. The power supply circuit of claim 5, wherein said turn-off means is enabled in response to operation of said in shunt with said switching means for diverting operating current away from said switching means.

7. The power supply circuit of claim 5, wherein said turn-off means is enabled in response to operation of said power switch means to a second state.

8. The power supply circuit of claim 6, wherein said switching means comprises a relay having an operate winding connected in circuit with said enabling means and said load condition sensing means, and having normally open contacts connected in circuit with said primary winding.

9. The power supply circuit of claim 1, wherein said transformer comprises a laminated magnetic core having said primary winding, said secondary winding and said auxiliary winding wound thereon.

10. The power supply circuit of claim 1, wherein said transformer comprises a magnetic core member and a magnetic frame surrounding said core member, said primary winding and said secondary winding being wound on said core member, and a magnetic shunt including a further magnetic core member having said auxiliary winding wound thereon.

11. A power supply circuit for producing an operating voltage for a load comprising:
  a step-up transformer having a primary winding and a secondary winding;
  switching means operable when enabled to connect said primary winding to a source of alternating current, said primary winding being disconnected from said source when said switching means is disabled;
  the load being connectable to said secondary winding;
  enabling means for enabling said switching means to operate to connect said primary winding to said source of alternating current whereby an operating voltage is produced on said secondary winding for energizing the load when the load is connected to said secondary winding;
  and load condition sensing means including an auxiliary winding of said transformer for producing a control voltage for maintaining said switching means enabled only when the load is connected to said secondary winding, said auxiliary winding being electrically independent of said secondary winding so that no current flows in common through said secondary winding and said auxiliary winding, said enabling means including timing means disabling said switching means to thereby disconnect said primary winding from said source whenever said control voltage fails to be produced within a predetermined time after said switching means is enabled.

12. The power supply circuit of claim 11, wherein said control voltage produced by said auxiliary winding is proportional to load current flowing through the load, permitting said enabling means to disable said switching means for open-circuit load conditions.

13. The power supply circuit of claim 11, wherein said enabling means includes power switch means manually operable to a first state to cause said timing means to initiate said predetermined time interval.

14. The power supply circuit of claim 13, including turn-off means operable when enabled to override said control voltage to thereby disable said switching means.

15. The power supply circuit of claim 14, wherein said turn-off means includes means for providing a circuit path in shunt with said switching means for diverting operating current away from said switching means.

16. The power supply circuit of claim 15, wherein said turn-off means is enabled in response to operation of said power switch means to a second state.

17. The power supply circuit of claim 11, wherein said transformer comprises a laminated magnetic core having said primary winding, said secondary winding and said auxiliary winding wound thereon.

18. The power supply circuit of claim 11, wherein said transformer comprises a magnetic core member and a magnetic frame surrounding said core member, said primary winding and said secondary winding being wound on said core member, and a magnetic shunt including a further magnetic core member having said auxiliary winding wound thereon.

* * * * *

UNITED STATES PATENT AND TRADEMARK OFFICE
CERTIFICATE OF CORRECTION

PATENT NO. : 5,291,099
DATED : March 1, 1994
INVENTOR(S) : John M. Gill and Robert H. Clausing It is certified that error appears in the above-indentified patent and that said Letters Patent is hereby corrected as shown below:

Column 6, line 68, after "means" delete "is enabled in response to operation of" and insert --includes means for providing a circuit path--; and Column 7, line 1, delete "said" first occurrence.

Signed and Sealed this

Sixteenth Day of August, 1994

Attest:

BRUCE LEHMAN

*Attesting Officer*      *Commissioner of Patents and Trademarks*